(12) United States Patent
Park et al.

(10) Patent No.: US 8,352,993 B2
(45) Date of Patent: Jan. 8, 2013

(54) METHOD FOR PROVIDING VIEWING INFORMATION FOR DISPLAYING A LIST OF CHANNELS VIEWED BY CALL RECIPIENTS

(75) Inventors: Ji-hyun Park, Seoul (KR); Ji-eun Kim, Yongin-si (KR); Hyun-jin Kim, Seoul (KR); Sung-baik Jo, Suwon-si (KR); Il-kown Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 754 days.

(21) Appl. No.: 12/119,527

(22) Filed: May 13, 2008

(65) Prior Publication Data

US 2009/0119726 A1 May 7, 2009

(30) Foreign Application Priority Data

Nov. 5, 2007 (KR) .................. 10-2007-0112365

(51) Int. Cl.
*H04N 7/173* (2011.01)
(52) U.S. Cl. ........ 725/106; 725/109; 725/110; 370/356; 370/355
(58) Field of Classification Search .................. 370/356, 370/355; 725/106, 109, 110
See application file for complete search history.

(56) References Cited

U.S. PATENT DOCUMENTS

| | | | | |
|---|---|---|---|---|
| 5,818,441 A | * | 10/1998 | Throckmorton et al. | 715/717 |
| 6,061,434 A | * | 5/2000 | Corbett | 379/93.35 |
| 7,603,683 B2 | * | 10/2009 | Reto | 725/34 |
| 2001/0038690 A1 | * | 11/2001 | Palmer et al. | 379/218.01 |
| 2002/0144273 A1 | | 10/2002 | Reto | |
| 2003/0005462 A1 | | 1/2003 | Broadus et al. | |
| 2003/0101450 A1 | * | 5/2003 | Davidsson et al. | 725/32 |
| 2004/0231003 A1 | * | 11/2004 | Cooper et al. | 725/135 |
| 2005/0066365 A1 | * | 3/2005 | Rambo | 725/51 |
| 2005/0108767 A1 | * | 5/2005 | Ma | 725/105 |
| 2007/0060054 A1 | * | 3/2007 | Romesburg | 455/41.2 |
| 2007/0139514 A1 | * | 6/2007 | Marley | 348/14.01 |
| 2007/0169148 A1 | * | 7/2007 | Oddo et al. | 725/46 |
| 2007/0198738 A1 | * | 8/2007 | Angiolillo et al. | 709/231 |
| 2007/0288627 A1 | * | 12/2007 | Abella et al. | 709/224 |
| 2008/0026694 A1 | * | 1/2008 | Ramanathan et al. | 455/39 |

FOREIGN PATENT DOCUMENTS

| | | |
|---|---|---|
| WO | 00/13416 A1 | 3/2000 |
| WO | 01/50309 A2 | 7/2001 |

* cited by examiner

*Primary Examiner* — Pankaj Kumar
*Assistant Examiner* — Sahar Baig
(74) *Attorney, Agent, or Firm* — Sughrue Mion, PLLC

(57) ABSTRACT

A method for providing viewing information is presented. The method includes displaying a call recipient list including at least one call recipient; and displaying a channel being viewed by each call recipient on the call recipient list.

28 Claims, 6 Drawing Sheets

METHOD FOR PROVIDING VIEWING INFORMATION FOR DISPLAYING A LIST OF CHANNELS VIEWED BY CALL RECIPIENTS

CROSS-REFERENCE TO RELATED APPLICATIONS

This application claims priority under 35 U.S.C. §119 from Korean Patent Application No. 10-2007-0112365, filed on Nov. 5, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing viewing information and more particularly, to providing viewing information when using video telephony through a television.

2. Description of the Related Art

As electronic technology has developed, multifunctional electronic devices providing convenience and functionality have appeared on the market. In particular, with development in network infrastructure and Internet, electronic devices having an Internet function such as Internet-connectable televisions (TV), refrigerators, and microwave ovens have become widespread.

Among such multifunctional electronics, Internet-connectable TVs have already been shared on the market. Moreover, TVs are basically display media, and TVs having video telephony functions and an image input function have also been introduced.

Accordingly, users can use the large screen of such a TV for video telephony, and perform video telephony while viewing a TV program.

However, during video telephony, if a sending apparatus and a receiving apparatus are viewing different channels, TV audio at the receiving end may disturb video telephony.

In addition, a user may have difficulty determining which channel a user at the other end is viewing.

Therefore, there is a need for methods for the user to use video telephony more conveniently while viewing TV.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a method for providing viewing information by displaying channels currently viewed by call recipients on a call recipient list so that users can utilize video telephony more conveniently while watching TV.

Another aspect of the present invention provides a viewing information providing method for transmitting viewing information to an external device if the viewing information is shared.

Yet another aspect of the present invention provides a viewing information providing method for receiving information regarding channels viewed by other call recipients from external devices.

Yet another aspect of the present invention provides a viewing information providing method for displaying information regarding broadcast content viewed by call recipients along with a call recipient list.

According to an exemplary aspect of the present invention, there is provided a method for providing viewing information, the method comprising displaying a call recipient list, and displaying a channel being viewed by each call recipient on the call recipient list.

In the displaying the channel being viewed, the channel being viewed by each call recipient is displayed at an area of the call recipient list for displaying information regarding the call recipients.

In the displaying the channel being viewed, the channel being viewed by each call recipient is displayed by allocating a separate category to the call recipient list.

The method further comprises receiving the viewing information of the call recipient from an external device used by the call recipient.

The viewing information comprises at least one of the genre of a program being viewing, information regarding a channel being viewed, and the title of the program being viewed.

The method further comprises displaying on the call recipient list whether or not the viewing information, which is information regarding the channel being viewed by the call recipient, is shared.

According to another exemplary aspect of the present invention, there is provided a method for providing viewing information, which is information regarding a channel being viewed by a user, the method comprising receiving input regarding whether or not to share the viewing information, and transmitting the viewing information to an external device if the viewing information is shared.

The method further comprises selecting by a user a subset of call recipients on a call recipient list, and setting the viewing information to be shared to the selected call recipients.

The method further comprises displaying on the call recipient list whether or not to share the viewing information.

In the transmitting the viewing information, if the viewing information is shared, the viewing information is transmitted to the external device when the call recipient requests the viewing information.

According to another exemplary aspect of the present invention, there is provided a method for providing viewing information when video telephony is performed using an image apparatus, the method comprising transmitting a video telephony request to an external device which is connected to the image apparatus, and receiving a response to accept the video telephony request from the external device and first viewing information regarding a channel being viewed by the external device.

The method further comprises determining whether or not a first channel which is the channel being viewed by the external device is the same as a second channel which is a channel being viewed by the image apparatus, based on the first viewing information.

The method further comprises transmitting a request for common viewing of the second channel to the external device if the first channel is different from the second channel.

In the transmitting the request, if the first channel is different from the second channel, the request for common viewing of the second channel is transmitted to the external device, and second viewing information, which is information regarding the second channel, is transmitted to the external device.

The method further comprises transmitting a request for common viewing of the first channel to the external device if the first channel is different from the second channel.

The method further comprises controlling a video telephony mode according to whether or not the first channel is the same as the second channel.

In the controlling the video telephony mode, if the first channel is the same as the second channel, the video telephony mode is set to a common viewing mode.

In the common viewing mode, the volume of a TV program is maintained after the video telephony is initiated.

In the controlling the video telephony mode, if the first channel is different from the second channel, the volume of the TV program decreases after video telephony is initiated.

The first viewing information comprises at least one of the genre of a program being viewed, information regarding a channel being viewed, and the title of the program being viewed.

According to another exemplary aspect of the present invention, there is provided a method for providing viewing information, the method comprising displaying a call recipient list, and displaying viewing broadcast content information for each call recipient on the call recipient list.

In the displaying viewing broadcast content information, the viewing broadcast content information for each call recipient is displayed on an area of the call recipient list for displaying information regarding the call recipients.

In the displaying viewing broadcast content information, the viewing broadcast content information for each call recipient is displayed by allocating a separate category to the call recipient list.

The method further comprises receiving the viewing information for the call recipient from an external device used by the call recipient.

The viewing information comprises at least one of the genre of a program being viewed, information regarding a channel being viewed, and the title of the program being viewed.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
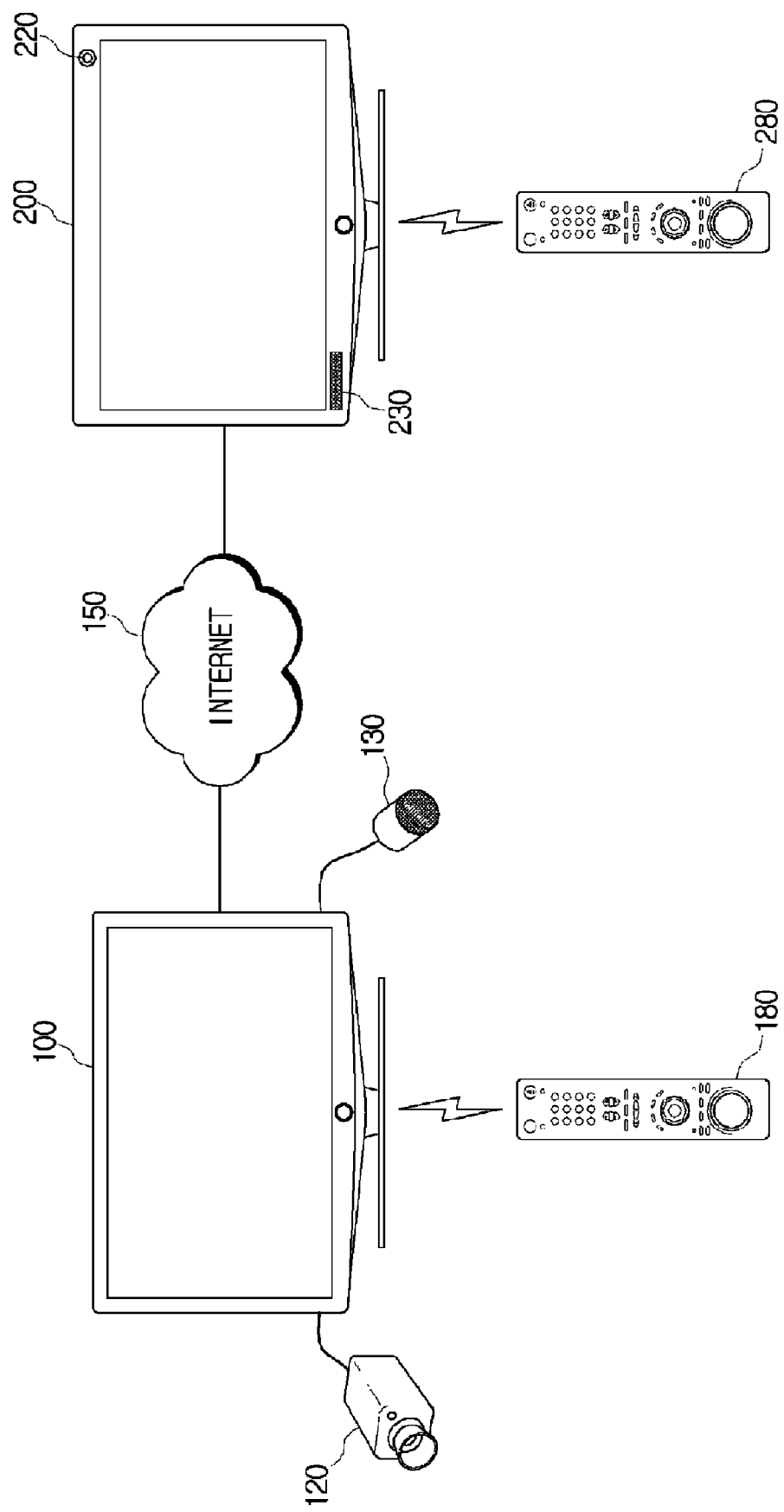
FIG. 1 is a schematic perspective view of a transmitting TV and a receiving TV in video telephony according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic perspective view of a receiving TV 100 and a transmitting TV 200 used in video telephony according to an exemplary embodiment of the present invention. As shown in FIG. 1, the receiving TV 100 and the transmitting TV 200 are connected over the Internet 150.

The receiving TV 100 is connected to an external video capturing unit 120 and an external microphone 130. The receiving TV 100 is controlled by a user through a remote control 180.

The transmitting TV 200 embeds a video capturing unit 220 and a microphone 230. The transmitting TV 200 is controlled by the user through a remote control 280.

The transmitting TV 200 may also be externally connected to the video capturing unit 220 and the microphone 230. In addition, the microphone 230 may be concealed within the transmitting TV 200 in usual situations, and appear externally when the user uses video telephony.

The transmitting TV 200 and the receiving TV 100 are connected over the Internet so that video telephony can be performed.

The microphones 130 and 230 are used for audio telephony between the transmitting TV 200 and the receiving TV 100. The video capturing units 120 and 220 and the microphones 130 and 230 are used for video telephony between the transmitting TV 200 and the receiving TV 100.

The transmitting TV 200 transmits a call request signal to the receiving TV 100. If the receiving TV 100 accepts the request, the transmitting TV 200 and the receiving TV 100 perform video telephony.

Video telephony between the transmitting TV 200 and the receiving TV 100 is provided through the Internet 150. Accordingly, a server for video telephony is provided by a video telephony providing company on the Internet 150. For example, when audio telephony or video telephony between the transmitting TV 200 and the receiving TV 100 is performed using an Internet phone, a server for providing Internet phone service using Voice over Internet Protocol (VoIP) or Multimedia over Internet Protocol (MOIP) on the Internet is needed.

As described above, communication between the transmitting TV 200 and the receiving TV 100 is enabled using the server of the phone service providing company. Furthermore, the transmitting TV 200 and the receiving TV 100 can each receive phone numbers from the phone service providing company.

Figure 2:
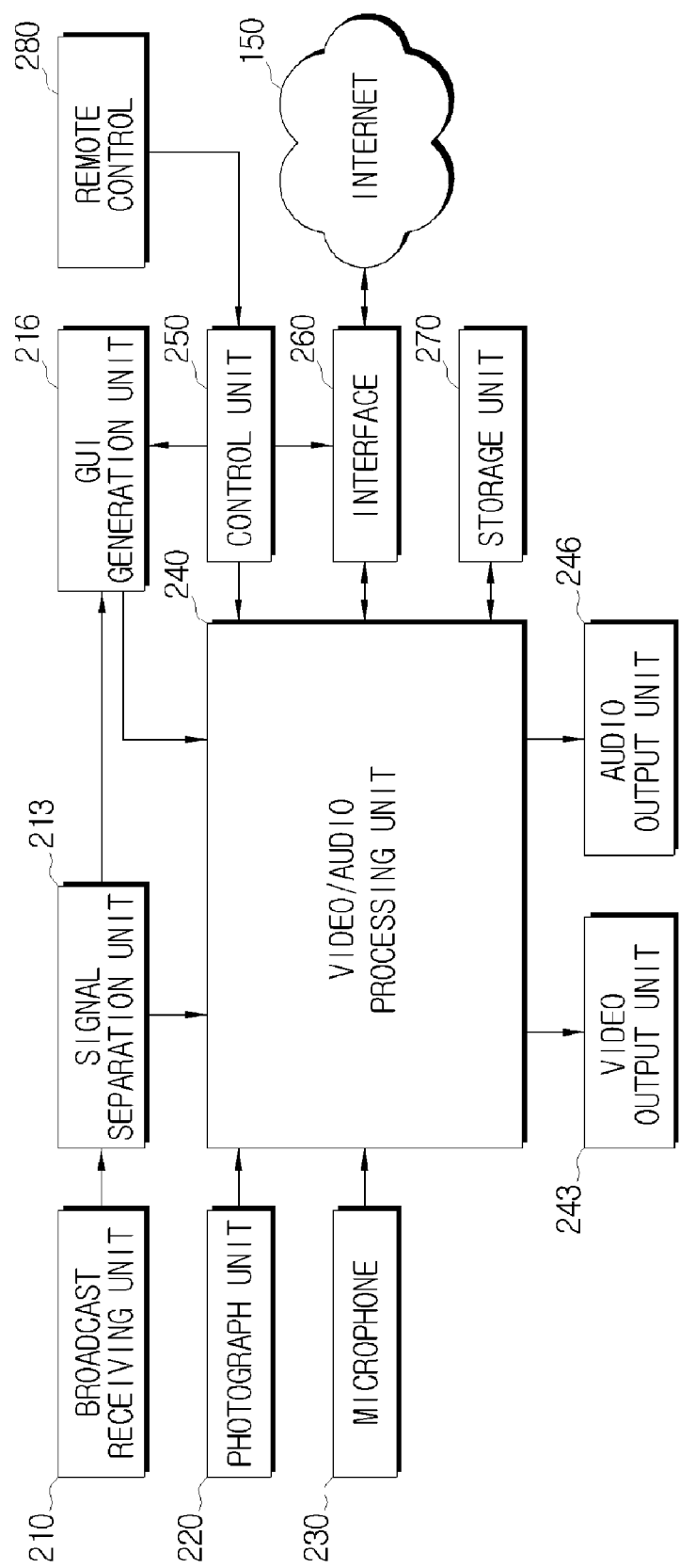
FIG. 2 is a detailed block diagram of a TV according to an exemplary embodiment of the present invention.

The configuration of the transmitting TV 200 (referred to hereinafter as TV 200) is described below in detail with reference to FIG. 2. FIG. 2 is a detailed block diagram of the TV 200 according to an exemplary embodiment of the present invention.

The TV 200 includes a broadcast receiving unit 210, a signal separation unit 213, a graphical user interface (GUI) generation unit 216, a video capturing unit 220, a microphone 230, a video/audio processing unit 240, a video output unit 243, an audio output unit 246, a control unit 250, an interface 260, a storage unit 270, and a remote control 280.

The broadcast receiving unit 210 receives and demodulates broadcasts from broadcast stations or satellites based on wired or wireless connections.

The signal separation unit 213 separates a video signal, an audio signal, and an additional information signal from a received broadcast signal. The additional information includes an electronic program guide (EPG). The signal separation unit 213 transmits the video and audio signals to the video/audio processing unit 240, and transmits the additional information signal to the GUI generation unit 216.

The GUI generation unit 216 generates a GUI to be provided to the user. For example, the GUI generation unit 216 generates a GUI to be displayed as an EPG with the received additional information, and transmits the GUI to the video/audio processing unit 240.

The GUI generation unit 216 receives a call recipient list from the storage unit 270 or an external device, and generates a GUI to display the call recipient list on the screen.

The video capturing unit 220 captures video of the user, and transmits the captured video to the video/audio processing unit 240. The captured video may be transmitted and displayed through the video output unit 243, or stored in the storage unit 270. Moreover, during video telephony, the captured video may be transmitted to the receiving TV 100 through the interface 260.

The microphone 230 receives input of the voice of the user, and transmits the input voice to the video/audio processing unit 240. The input voice may be output through the audio output unit 246 and provided for a user as sound using a speaker, or may be stored in the storage unit 270. In addition, during audio telephony or video telephony, the input voice may be transmitted to the receiving TV 100 through the interface 260.

The video/audio processing unit 240 processes video signals and audio signals input from the signal separation unit 213, GUI generation unit 216, video capturing unit 220, and microphone 230. Specifically, the video/audio processing unit performs video decoding, video scaling, and audio decoding. In addition, the video/audio processing unit 240 adds a GUI generated by the GUI generation unit 216 to captured video.

The video/audio processing unit 240 outputs video signals to the video output unit 243, and outputs audio signals to the audio output unit 246.

When the video signals and audio signals are stored in the storage unit 270 or transmitted to the receiving TV 100 through the interface 260, the video/audio processing unit 240 outputs the video signals and audio signals in a compressed format to the storage unit 270 or the interface 260.

The video output unit 243 displays video output from the video/audio processing unit 240 on a display, or outputs the video to an external device connected through an external output terminal (for example, an external display).

The audio output unit 246 outputs audio output from the video/audio processing unit 240 through a speaker, or outputs the audio to an external device connected through an external output terminal (for example, an external speaker).

The interface 260 connects the TV 200 to the Internet 150, and transmits a video telephony request signal to the receiving TV 100. In addition, the interface 260 receives results of the video telephony request from the receiving TV 100.

An interface (not shown) of the receiving TV 100 receives the video telephony request signal from the TV 200, and transmits a reply to the received request to the TV 200.

The storage unit 270 stores broadcast data received from the broadcast receiving unit 210, video captured by the video capturing unit 220, and audio data input through the microphone 230, and outputs the stored video and audio data to the video/audio processing unit 240. The storage unit 270 may be implemented as a hard disk or a non-volatile memory.

The storage unit 270 stores a call recipient list of the TV 200. However, the call recipient list of the TV 200 does not have to be stored in the storage unit 270, and may be stored in a server through a messenger (for example, a VoIP messenger) service provided from a phone providing company.

The remote control 280 receives user commands from the user and transmits the commands to the TV 200. In addition, the user can select a recipient for video telephony on the call recipient list using the remote control 280.

The control unit 250 detects user commands received from the remote control 280, and controls the overall operation of the TV 200 accordingly.

In particular, the control unit 250 operates the TV 200 to display channels viewed by call recipients on the call recipient list. Other broadcast content information as well as channels can also be displayed. The broadcast content information is information regarding broadcast programs viewed by users, including the title, broadcast time, and genre of each program, as well as the channel.

The control unit 250 receives input on whether or not to share viewing information regarding a channel viewed by the user, and transmits the viewing information to the receiving TV 100 if the viewing information is shared.

The control unit 250 transmits video telephony request information to the receiving TV 100, and receives video telephony acceptance information and first viewing information regarding a channel being viewed in the receiving TV 100 from the receiving TV 100.

The operation of the control unit 250 will be described in greater detail below.

Figure 3:
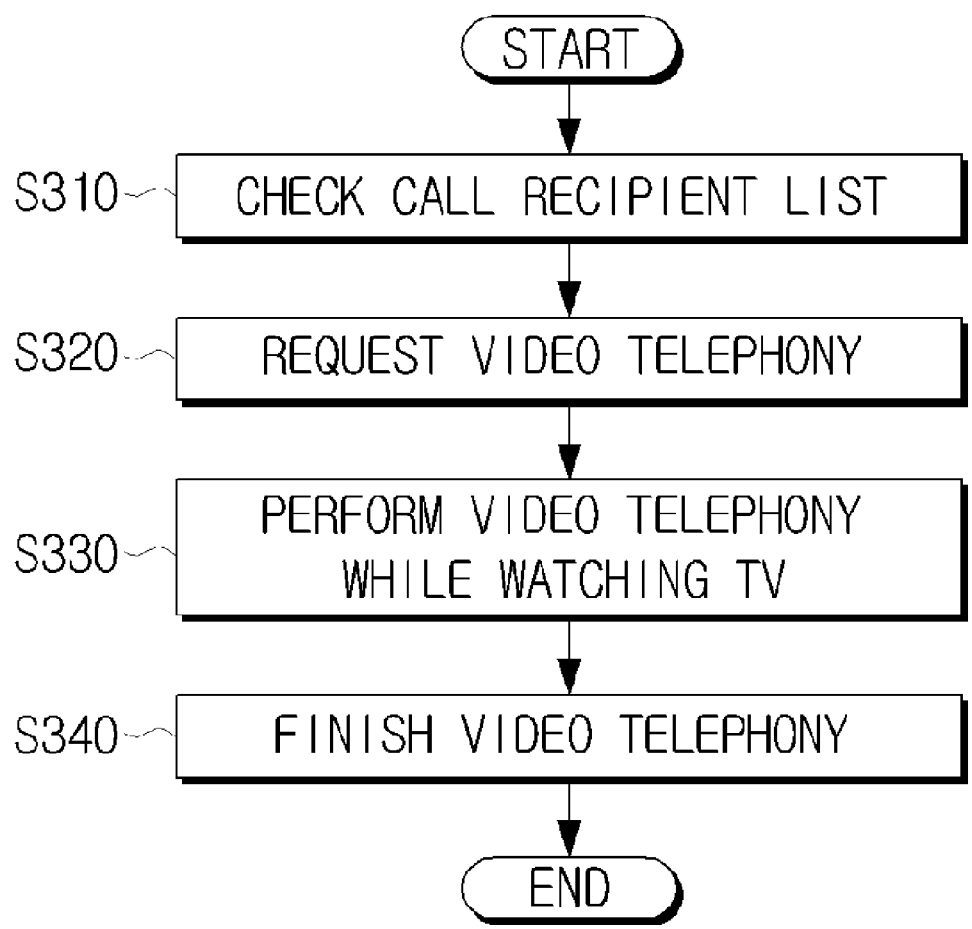
FIG. 3 is a flow chart illustrating a video telephony process according to an exemplary embodiment of the present invention.

FIG. 3 is a flow chart illustrating a video telephony process according to an exemplary embodiment of the present invention.

Firstly, the control unit 250 checks a call recipient list (S310). More specifically, the control unit 250 displays the call recipient list on the screen, and then displays channels viewed by the call recipients on the call recipient list. In addition, the control unit 250 displays on the call recipient list whether or not the call recipients share viewing information regarding viewing channels.

The control unit 250 may convert a video telephony mode of the TV 200 to an absent mode. For example, if the user does not perform video telephony during 5 minutes, the TV 200 is changed to an absent mode.

Likewise, if the receiving TV 100 is changed to an absent mode, the control unit 250 displays the current mode of the receiving TV 100 on the call recipient list as an away mode.

Subsequently, the control unit 250 of the TV 200 sends a request for video telephony to the receiving TV 100 (S320). More specifically, the TV 200 receives viewing information regarding a channel being viewed from the receiving TV 100, and determines whether or not the channel viewed by the user of the TV 200 is identical to the channel viewed by the user of the receiving TV 100 based on the received viewing information.

If the channel viewed by the user of the TV 200 differs from the channel viewed by the user of the receiving TV 100, the control unit 250 transmits call request information and a common viewing request to the receiving TV 100. For the common viewing request, the control unit 250 may transmit information regarding a channel currently being viewed of the control unit 250 to the receiving TV 100.

Subsequently, the control unit 250 performs video telephony while the user watches TV (S330). In order to concentrate on video telephony, the TV audio may be muted.

If the TV 200 and the receiving TV 100 displays different channels, the control unit 250 may decrease the volume of the TV program. If the TV 200 and the receiving TV 100 are displaying the same channel, the control unit 250 converts the video telephony mode to a common viewing mode (for example, a mode in which the volume of the TV program is maintained).

Subsequently, video telephony may be terminated by the user's manipulation (S340). Following this process, the user can perform video telephony while watching a TV program.

Figure 4:
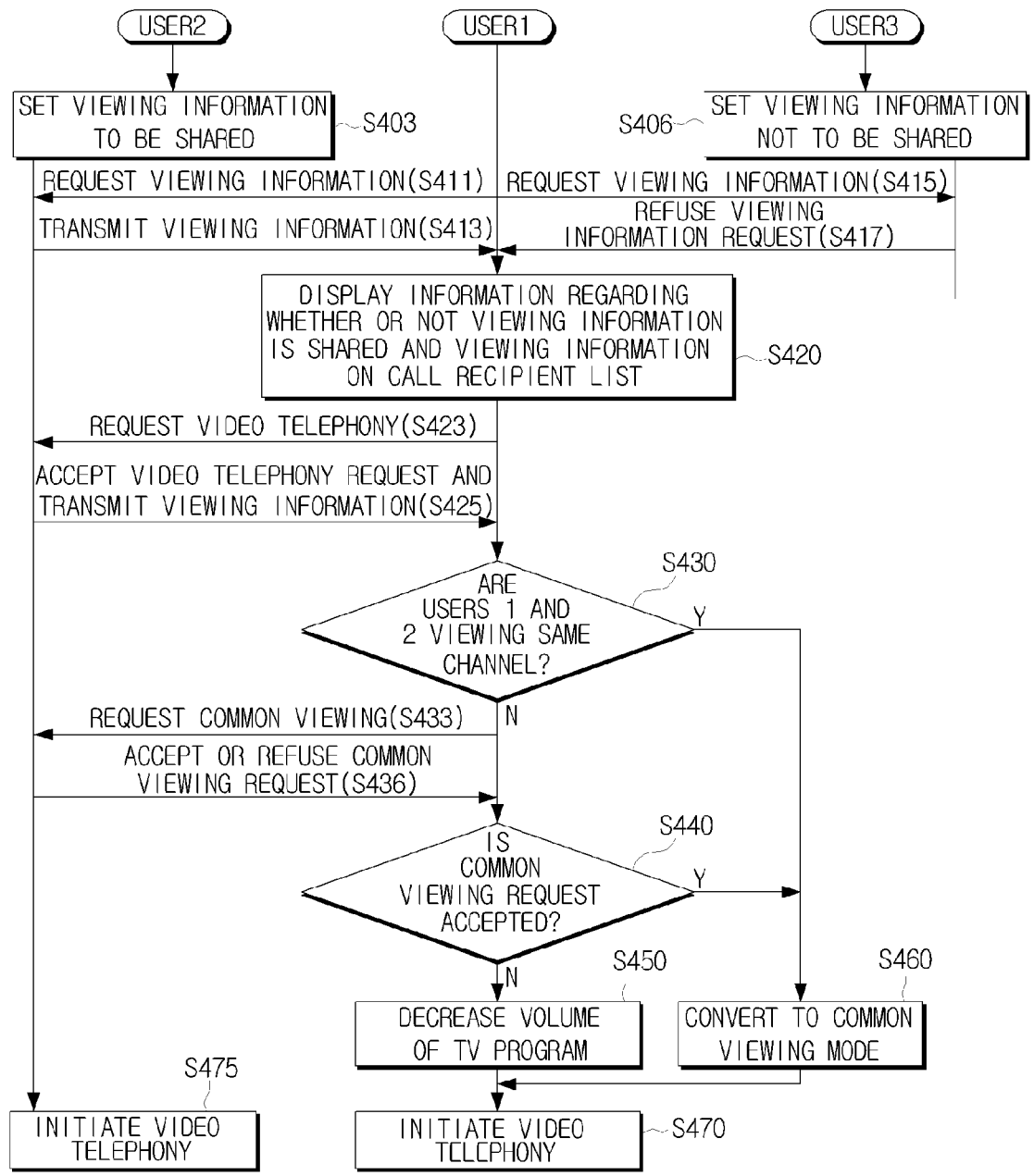
FIG. 4 is a flow chart illustrating in more detail a video telephony process according to an exemplary embodiment of the present invention.

Hereinafter, the process of initiating video telephony is described in greater detail. FIG. 4 is a flow chart illustrating the process of performing video telephony according to an exemplary embodiment of the present invention.

In FIG. 4, user 1 uses the transmitting TV 200 of FIG. 1, user 2 uses the receiving TV 100 of FIG. 1, and user 3 uses a third TV which is not shown in FIG. 1.

User 2 sets the receiving TV 100 to share viewing information (S403). The viewing information is information regarding the channel viewed by user 2. The viewing information includes at least one of information regarding the user, the genre of the program, channel information, and the title of the program. For example, the viewing information of user 2 may include "user 2", "movie", "OCN", and "Titanic".

In addition, user 2 selects some of a call recipient list of the receiving TV 100, and sets the receiving TV 100 to share viewing information with the selected call recipients. The receiving TV 100 can display on the call recipient list whether or not the viewing information is shared.

For example, if the receiving TV 100 is set to share viewing information with user 1, "user 1" is displayed with "may view" on the call recipient list of the receiving TV 100.

User 3 sets the 3rd TV not to share viewing information of the 3rd TV (S406). Accordingly, although the 3rd TV receives a viewing information share request, the 3rd TV does not transmit the viewing information.

"User 1" is displayed with "may not view" on the call recipient list of the 3rd TV.

As the receiving TV 100 and the 3rd TV can display on their list of call recipients whether or not to share their viewing information, the user can easily check who is permitted to receive the user's viewing information.

Subsequently, the TV 200 of user 1 transmits a viewing information request to the receiving TV 100 of user 2 and the 3rd TV of user 3 (S411 and S415). As the 3rd TV is set not to share its viewing information, the 3rd TV refuses the viewing information request (S417).

However, as the receiving TV 100 is set to share its viewing information, the receiving TV 100 transmits the viewing information to the TV 200 (S413).

Using the received viewing information, the TV 200 of user 1 displays whether or not to share viewing information, and displays the viewing information, if the viewing information is shared, for each call recipients separately on the call recipient list (S420).

The call recipient list is a list on which call recipients are recorded, and may be, for example, a telephone directory or a list of friends in a VoIP messenger. The call recipient list includes names, telephone numbers and user identifications of the call recipients.

In more detail, the control unit 250 displays channels currently being viewed by participants on the call recipient list. The channels currently being viewed by the call recipients are contained in the viewing information received from each call recipient.

In particular, the control unit 250 displays the channels currently being viewed by call recipients on an area for information regarding the call recipients in the call recipient list.

For example, the control unit 250 may display an icon representing a channel currently being viewed by a call recipient next to the name of the call recipient.

Figure 5:
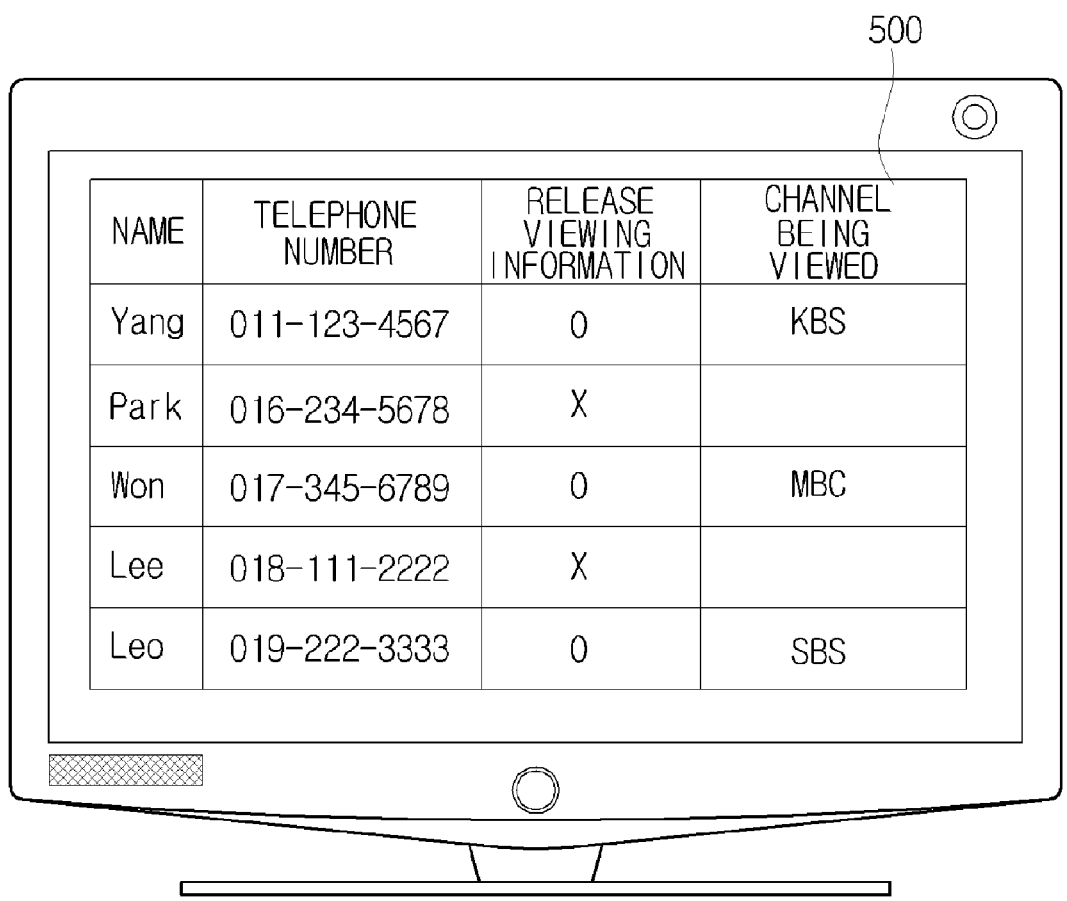
FIG. 5 is a drawing illustrating an example of a call recipient list according to an exemplary embodiment of the present invention.

In addition, the control unit 250 may display the channels currently being viewed by call recipients by allocating a separate category to the call recipient list. For example, a category for "currently viewed channel" is added next to the categories for "name" and "telephone number" as shown in FIG. 5.

The control unit 250 displays whether or not to share viewing information on the call recipient list. Specifically, the control unit 250 receives viewing information from the call recipients, and displays whether or not to share the viewing information on the call recipient list based on the received viewing information.

For example, it is assumed that the viewing information of user 2 is shared with user 1 and the viewing information of user 3 is not shared with user 1. Accordingly, in the call recipient list of the TV 200 of user 1, user 2 is displayed with "may view" and user 3 is displayed with "may not view" as shown in FIG. 5.

Subsequently, the control unit 250 of the TV 200 of user 1 transmits a video telephony request to the receiving TV 100 of user 2 (S423). The control unit 250 may transmit a viewing information request to the receiving TV 100 of user 2 at the same time.

The receiving TV 100 of user 2 transmits a reply to accept the video telephony request and the viewing information to the TV 200 of user 1 (S425).

The control unit 250 determines whether or not the channel being viewed by user 1 is the same as the channel being viewed by user 2 based on the viewing information (S430). If the channel being viewed by user 1 is the same as the channel being viewed by user 2 (S430-Y), the control unit 250 converts a video telephony mode of the TV 200 to a common viewing mode (S460).

The common viewing mode is a mode in which the call sender and the call recipient are viewing the same TV program. In a common viewing mode, the volume of the TV program is not minimized since the same TV program is viewed during video telephony. In addition, in a common viewing mode, a window for video telephony is adjusted to be of an appropriate size not to hide a large part of a window for the TV program being viewed.

If users 1 and 2 are watching different channels (S430-N), the control unit 250 transmits a common viewing request to the receiving TV 100 of user 2 (S433). A channel for common viewing may be the channel being viewed by user 1, the channel being viewed by user 2, or a third channel determined by user 1.

If a channel for common viewing is the channel being viewed by user 2, the control unit 250 transmits only a common viewing request to the receiving TV 100 of user 2 since the control unit 250 has the received viewing information of the receiving TV 100.

However, if a channel for common viewing is the channel being viewed by user 1, the control unit 250 transmits a common viewing request and viewing information of user 1 to the receiving TV 100 of user 2.

Subsequently, the receiving TV 100 of user 2 transmits a reply to the common viewing request to the TV 200 (S436).

If user 2 accepts the common viewing request (S440-Y), the control unit 250 controls the TV 200 to change to the channel of the receiving TV 100. The control unit 250 sets the video telephony mode to the common viewing mode (S460).

If user 2 rejects the common viewing request (S440-N), the control unit 250 decreases the volume of the TV program currently being viewed on the TV 200 since users 1 and 2 view different TV programs during video telephony (S450). In addition, the control unit 250 may minimize functions for displaying the TV program by pausing the TV program, decreasing the sound of the TV program, or minimizing the window for the TV program. This prevents sound of the different TV programs from disturbing video telephony between users 1 and 2.

Subsequently, video telephony are initiated between the TV 200 of user 1 and the receiving TV 100 of user 2 (S470 and S475).

The process of initiating video telephony has been described in detail with reference to FIG. 4.

Hereinafter, an example of a call recipient list, and an example of a TV program window and a video telephone services window are described in detail with reference to FIGS. 5 and 6. FIG. 5 is a drawing illustrating an example of a call recipient list according to an exemplary embodiment of the present invention.

As shown in FIG. 5, the call recipient list 500 includes names of call recipients, telephone numbers of call recipients, whether or not call recipients are sharing viewing information, and information regarding channels being viewed.

In FIG. 5, Park and Lee set viewing information not to be shared, so viewing information for Park and Lee cannot be viewed. However, viewing information for Yang, Won, and Leo are set to be shared, so channels being viewed by Yang, Won, and Leo can be viewed.

Therefore, the user can request common viewing based on the information regarding whether or not call recipients are sharing viewing information and the channels being viewed, which are displayed on the call recipient list 500.

Figure 6:
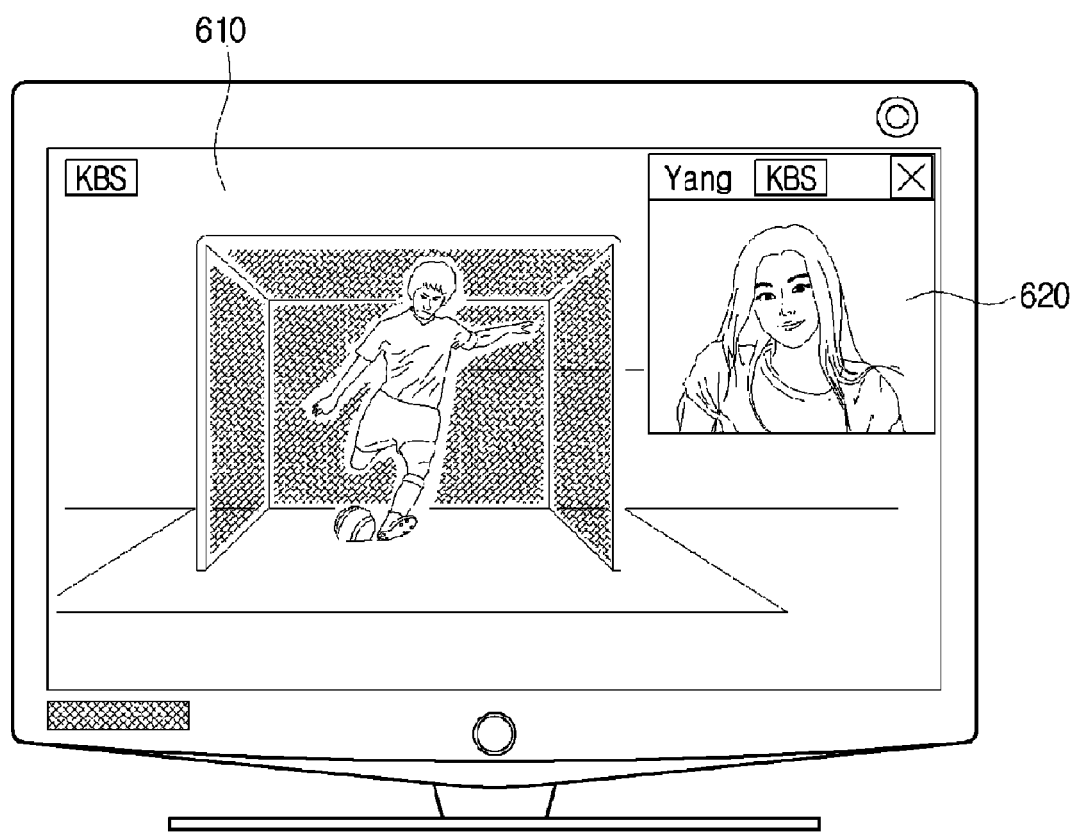
FIG. 6 is a drawing illustrating an example of a TV screen when video telephony and TV program viewing are performed concurrently according to an exemplary embodiment of the present invention.

FIG. 6 is a drawing illustrating an example of a TV screen when video telephony and TV program viewing are performed concurrently according to an exemplary embodiment of the present invention.

FIG. 6 illustrates a situation in which the transmitting TV and the receiving TV are operated in a common viewing mode. As shown in FIG. 6, the TV program window 610 and the video telephony window 620 are displayed together during video telephony.

The TV program window 610 displays channel "KBS", and a call recipient Yang also views "KBS". That is, FIG. 6 illustrates the case of a common viewing mode.

Therefore, the user can view a TV program during video telephony.

In this exemplary embodiment, channels being viewed are displayed on a call recipient list, but information regarding broadcast content other than channels being viewed can also be displayed. For example, channels being viewed may be replaced with the title of the TV programs being viewed.

As can be appreciated from the above description, viewing information is provided by displaying channels currently being viewed by call recipients on a call recipient list so that users can utilize video telephony more conveniently while watching TV.

In particular, the channel being viewed by each call recipient is displayed on a call recipient list so that the user can easily view who is watching which channel.

In addition, viewing information is transmitted to an external device only when the viewing information is set to be shared, so the user can choose whether or not to provide the viewing information.

Moreover, the user receives information regarding the channel being viewed by other users, so the user can perform video telephony while watching the same channel as the call recipient by transmitting a common viewing request to the external device.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing viewing information when video telephony is performed using an image apparatus, the method comprising:
   receiving a broadcast program and displaying the broadcast program;
   transmitting a video telephony request to an external device, which is connected to the image apparatus;
   receiving a response to accept the video telephony request and first viewing information regarding a channel being viewed by the external device from the external device; and
   displaying a video telephony window,
   wherein the image apparatus determines whether or not a first channel which is the channel being viewed by the external device is the same as a second channel which is a channel being viewed by the image apparatus, based on the first viewing information, and controls a video telephony mode according to whether or not the first channel is the same as the second channel.

2. The method of claim 1, further comprising transmitting a request for common viewing of the second channel to the external device if the first channel is different from the second channel.

3. The method of claim 1, wherein transmitting the request comprises:
   transmitting a request for common viewing to the external device, if the first channel is different from the second channel, and
   transmitting second viewing information, which is information regarding the second channel, to the external device.

4. The method of claim 1, further comprising transmitting a request for common viewing of the first channel to the external device if the first channel is different from the second channel.

5. The method of claim 1, wherein the controlling the video telephony mode comprises setting, the video telephony mode to a common viewing mode if the first channel is the same as the second channel.

6. The method of claim 1, wherein the common viewing mode comprises maintaining the volume of a TV program after the video telephony are initiated.

7. The method of claim 1, wherein the controlling the video telephony mode comprises decreasing the volume of the TV program after video telephony is initiated, if the first channel is different from the second channel.

8. The method of claim 1, wherein the first viewing information comprises at least one of a genre of a program being viewed, information regarding a channel being viewed, and the title of the program being viewed.

9. The method of claim 1, further comprising:
   displaying a call recipient list comprising at least one call recipient; and displaying a channel being viewed by each call recipient on the call recipient list according to the received first viewing information.

10. The method of claim 9, wherein the displaying the channel being viewed comprises displaying the channel being viewed by each call recipient at an area of the call recipient list which displays information regarding each of the call recipients.

11. The method of claim 9, wherein the displaying the channel being viewed comprises displaying the channel being viewed by each call recipient by allocating a separate category to the call recipient list.

12. The method of claim 9, further comprising receiving the first viewing information includes receiving the first viewing information regarding each call recipient from external devices used by each call recipient.

13. The method of claim 12, wherein the first viewing information comprises at least one of the genre of a program being viewing, information regarding a channel being viewed, and the title of the program being viewed.

14. The method of claim 9, further comprising displaying, on the call recipient list, whether or not the first viewing information regarding each call recipient is shared, the first viewing information comprising information regarding the channel being viewed by each call recipient.

15. The method of claim 1, further comprising:
receiving input regarding whether or not to share the second viewing information regarding a channel being viewed by a user; and
transmitting the second viewing information to the external device if the viewing information is shared.

16. The method of claim 15, further comprising:
selecting, by a user, a subset of call recipients on a call recipient list, and
setting the viewing information to be shared to the selected call recipients.

17. The method of claim 15, further comprising displaying whether or not to share the viewing information on the call recipient list.

18. The method of claim 14, wherein the transmitting the second viewing information comprises transmitting the viewing information to the external device when the call recipient requests the viewing information, if the viewing information is shared.

19. A method for providing viewing information when video telephony is performed using an image apparatus, the method comprising:
receiving a broadcast program and displaying the broadcast program;
transmitting a video telephony request to an external device, which is connected to the image apparatus;
receiving a response to accept the video telephony request and viewing information regarding a content being viewed by the external device from the external device; and
displaying a video telephony window,
wherein the image apparatus determines whether or not a first channel which is the channel being viewed by the external device is the same as a second channel which is a channel being viewed by the image apparatus, based on the first viewing information and controls a video telephony mode according to whether or not the first channel is the same as the second channel.

20. The method of claim 19, further comprising:
displaying a call recipient list comprising at least one call recipient; and
displaying viewing broadcast content information for each call recipient on the call recipient list according to the received viewing information.

21. The method of claim 20, wherein the displaying viewing broadcast content information comprises displaying the viewing broadcast content information for each call recipient at an area of the call recipient list which displays information regarding the call recipients.

22. The method of claim 20, wherein the displaying viewing broadcast content information comprises displaying the viewing broadcast content information for each call recipient by allocating a separate category to the call recipient list.

23. The method of claim 20, further comprising receiving the viewing information for each call recipient from external devices used by each call recipient.

24. The method of claim 20, wherein the viewing information comprises at least one of a genre of a program being viewed, information regarding a channel being viewed, and the title of the program being viewed.

25. The method of claim 19, wherein the viewing information is viewing information regarding a channel being viewed by the external device.

26. An image apparatus comprising:
a broadcast receiving unit to receive a broadcast program;
a video output unit to display the received broadcast program;
an interface to transmit a video telephony request signal to an external device, which is connected to the image apparatus;
a controller to control the interface to receive a response regarding the video telephony request and viewing information regarding a channel being viewed by the external device from the external device and to control the video output unit to display a video telephony window,
wherein the image apparatus determines whether or not a first channel which is the channel being viewed by the external device is the same as a second channel which is a channel being viewed by the image apparatus, based on the first viewing information and controls a video telephony mode according to whether or not the first channel is the same as the second channel.

27. An image apparatus comprising:
a broadcast receiving unit to receive a broadcast program;
a video output unit to display the received broadcast program;
an interface to transmit a video telephony request signal to an external device, which is connected to the image apparatus;
a controller to control the interface to receive a response regarding to the video telephony request and viewing information regarding a content being viewed by the external device from the external device and to control the video output unit to display a video telephony window,
wherein the image apparatus determines whether or not a first channel which is the channel being viewed by the external device is the same as a second channel which is a channel being viewed by the image apparatus, based on the first viewing information and controls a video telephony mode according to whether or not the first channel is the same as the second channel.

28. The image apparatus of claim 27, wherein the viewing information is viewing information regarding a channel being viewed by the external device.

* * * * *